United States Patent
Betty

(10) Patent No.: US 6,795,594 B2
(45) Date of Patent: Sep. 21, 2004

(54) DUOBINARY MODULATION SCHEME FOR A MACH-ZEHNDER OPTICAL MODULATOR

(75) Inventor: Ian B. Betty, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 139 days.

(21) Appl. No.: 10/262,968

(22) Filed: Oct. 3, 2002

(65) Prior Publication Data

US 2004/0067020 A1 Apr. 8, 2004

(51) Int. Cl.[7] .............................. G02F 1/295; G02B 6/42
(52) U.S. Cl. ................................ 385/3; 385/8; 385/40
(58) Field of Search ............................... 385/1–10, 39, 385/40

(56) References Cited

U.S. PATENT DOCUMENTS

| | | | | |
|---|---|---|---|---|
| 5,524,076 A | | 6/1996 | Rolland et al. ................. | 385/8 |
| 5,543,952 A | * | 8/1996 | Yonenaga et al. ........... | 398/185 |
| 5,778,113 A | | 7/1998 | Yu ................................ | 385/3 |
| 5,991,471 A | | 11/1999 | Yu ................................ | 385/3 |
| 6,188,497 B1 | * | 2/2001 | Franck et al. ................ | 398/183 |
| 6,337,756 B1 | * | 1/2002 | Djupsjobacka ............. | 398/183 |
| 6,592,274 B2 | * | 7/2003 | Kahn et al. .................. | 398/141 |
| 2002/0181064 A1 | * | 12/2002 | Rosenkranz et al. ........ | 359/181 |

FOREIGN PATENT DOCUMENTS

GB    2305512 A  *  4/1997  ........... G02F/1/225

OTHER PUBLICATIONS

Franck, T. et al., "Novel Duobinary Transmitter", ECOC 97, Sep. 22–25, 1997, Conference Publication No. 448, IEE, 1997 pp. 67–70.*

Yonenaga, K. et al., "320 Gbit/s WDM repeaterless transmission using fully encoded 40 Gbit/s optical duobinary channels with dispersion tolerance of 380 ps/nm", Electronics Letters, Jan. 18, 2001, vol. 37, No. 2, pp. 109–110.*

Wichers, Maike et al., "Optical duobinary modulation schemes using a Mach–Zehnder transmitter for lightwave systems", ICTON'99, Jun. 9–11, 1999, IEEE, 1999, pp. 15–18.*

* cited by examiner

Primary Examiner—Akm Enayet Ullah
Assistant Examiner—M. R. Connelly-Cushwa

(57) ABSTRACT

In order to provide a low power duobinary modulator for the long reach 10 Gb/s metro space that is relatively small and relatively inexpensive to make, a method of operating a Multiple Quantum Well (MQW) III-V Mach-Zehnder (MZ) optical modulator to have it provide a high-quality duobinary signal is provided. The method of operating the MQW III-V MZ optical modulator provided by the invention makes possible a high-quality duobinary modulator that has substantially balanced 'on' states. That is to say, both duobinary 'on' states are characterized by having respective output signals with substantially equivalent: peak intensities; high extinction ratios; and low frequency chirp.

12 Claims, 5 Drawing Sheets

OFF TO ON-π STATE: ASYMMETRIC DRIVE

US 6,795,594 B2

DUOBINARY MODULATION SCHEME FOR A MACH-ZEHNDER OPTICAL MODULATOR

FIELD OF THE INVENTION

This invention relates to a method of operating a non-linear Mach-Zehnder (MZ) optical modulator.

BACKGROUND OF THE INVENTION

For high bit rate, long-haul communications supported by optical fibers, high quality light sources serving as transmitters are essential. A typical light source is made up of a laser operating in continuous wave (CW) mode to provide a beam of light to an electro-optical modulator that is controlled to switch the light on and off at the desired bit rate. The modulator may be controlled by the switching of differential control voltages to modify the characteristics of the output light beam according to a modulation format/scheme.

Such formats include simple binary modulation and the more complex duobinary format. Binary modulating a light source is basically a matter of switching the light on to represent a first state and switching the light off to represent a second state. Thus, in a binary modulation scheme there are only two possible states, the 'on' state and the 'off' state, each corresponding to either logic one or logic zero respectively. Alternatively, the duobinary format provides an optical signal more complex than one that can simply be in an 'on' or 'off' state. In fact, there are two 'on' states and one 'off' state. In both of the two 'on' states the light is on with equal intensity, but each 'on' state is ±π radians out of phase with the other.

A common modulator structure that is used to realize a number of modulation schemes/formats is the Mach-Zehnder (MZ) interferometer. A MZ interferometer is made up of a pair of waveguide arms connected between an optical waveguide splitter and a waveguide combiner. In operation, a light source (e.g. a laser) is optically coupled to the waveguide splitter that separates the laser's output light beam into two beams. The two newly separated light beams travel from the splitter into and through the pair of waveguide arms and are recombined within the waveguide combiner. Electrodes are associated with each of the waveguide arms and by applying a modulating voltage to one or both electrodes the relative phases of the two light beams can be altered.

There are also many design options that may be exercised that have the effect-of establishing a built-in phase shift between two beams of light within an interferometer. For example, a built-in phase shift can be established by a careful selection of the splitter (or coupler) design, choosing different lengths for each of the interferometer arms, or by adding separate electrodes that can be used to apply various drive voltages to induce different desired phase shifts. Specifically, as described in Yu (U.S. Pat. No. 5,991,471), the entire contents of which are herein incorporated by reference, the interferometer arms can be configured to induce a built-in phase shift between the two beams of light in the absence of a differential voltage applied between the two waveguide arms.

Currently, however, the only practical way in which to realize a duobinary signalling device (modulator) is to employ a Mach-Zehnder (MZ) interferometer based on a linear and real refractive index change mechanism known as a linear MZ optical modulator. However, linear MZ optical modulators have a number of drawbacks that limit their utility in some communication spaces. The drawbacks of linear MZ optical modulators include their relatively large size, high production cost and the high power consumption of their electrical drivers.

The aforementioned drawbacks stem from the fact that this type of modulator is commonly fabricated in a lithium niobate ($LiNbO_3$) process. Lithium niobate modulators are typically on the order of at least three inches long, and there are no foreseeable fabrication technologies in the art that would enable the construction of truly linear MZ optical modulators that could be on the order of a few millimeters in length.

MZ interferometers (modulators) can be fabricated from III-V semiconductor alloy materials such as Indium Phosphide (InP) and Indium Gallium Arsenic Phosphide (InGaAsP), employing structures having multiple quantum wells (MQW) and barriers, that enable the manufacture of MZ interferometers that are only a few millimeters in length.

All MZ modulators (interferometers) convert phase modulation into intensity modulation and it is important that the amplitude ratio between an 'on' state and the 'off' state is relatively high. This ratio, known as the extinction ratio (ER), is a measure of the signal intensity against the background noise. Beneficially, a high ER also permits greater span between repeaters in an optical transmission network.

Accordingly, thus far, as described in Yu (U.S. Pat. No. 5,991,471) and Rolland et al. (U.S. Pat. No. 5,524,076), the entire contents of both herein incorporated by reference, MQW III-V MZ optical modulators have been primarily used to produce simple binary modulators. Specifically, Rolland et al. discloses a simple binary modulation method, in which the output of the modulator may be considered either 'on' or 'off' based on its relative intensity without regard to phase of the output beam in the 'on' state (Col. 2, lines 1–18).

SUMMARY OF THE INVENTION

According to a first aspect, the invention provides a method of operating a non-linear Mach-Zehnder (MZ) optical modulator. The non-linear MZ optical modulator has first and second waveguide arms and corresponding first and second electrodes connected to the respective first and second waveguide arms. The method of operating the non-linear MZ optical modulator comprises a) operating the non-linear MZ optical modulator in a duobinary modulation format by: i) biasing both waveguide arms via the corresponding first and second electrodes at a first value of $V_{\pi/2}$ volts to obtain a duobinary 'off' output signal characteristic of a duobinary 'off' state; ii) biasing the first waveguide arm via the first electrode at zero volts and biasing the second waveguide arm via the second electrode at $V_\pi$ volts to obtain a first duobinary 'on' output signal characteristic of a first duobinary 'on' state; and, iii) biasing the second waveguide arm via the second electrode at zero volts and biasing the first waveguide arm via the first electrode at $V_\pi$ volts to obtain a second duobinary 'on' output signal characteristic of a second duobinary 'on' state.

In some embodiments of the invention the duobinary modulation defines: i) the first duobinary 'on' state as having the first duobinary 'on' output signal characterized as when the optical output power of the non-linear MZ optical modulator is at its peak intensity with a zero radian phase shift; ii) the second duobinary 'on' state as having the second duobinary 'on' output signal characterized as when the optical output power of the non-linear MZ optical modulator is at its peak intensity with a ±π radian phase shift; and iii) the duobinary 'off' state as having the duobinary 'off' output signal characterized as when the optical output power of the non-linear MZ optical modulator is substantially non-existent. Moreover, in some embodiments that the first and second duobinary 'on' output signals and the duobinary 'off' output signal are substantially free from frequency chirp.

Also, in some embodiments, the non-linear MZ optical modulator is a Multiple Quantum Well (MWQ) III-V MZ optical modulator; And, additionally, the non-linear MWQ III-V MZ optical modulator is adapted to include a ±π radian phase shift between waveguide arms comprising the MWQ III-V MZ optical modulator. In such embodiments it would be preferable that the III-V material comprising the Multiple Quantum Well (MQW) III-V MZ optical modulator is Indium Phosphide (InP) and the multiple quantum wells are composed of a Indium Gallium Arsenide Phosphide (InGaAsP) alloy. However, the non-linear MZ optical modulator may alternatively be comprised of III-V bulk materials or polymer materials.

In some embodiments method the value $V_{\pi/2}$ is the minimum voltage at which the phase of the non-linear MZ optical modulator output is $\pm\pi/2$ radians when a drive voltage is applied to one waveguide arm via the corresponding electrode, as for a one arm modulation procedure. Similarly, the value $V_\pi$ is the minimum voltage at which the phase of the non-linear MZ optical modulator output is $\pm\pi$ radians when a drive voltage is applied to one waveguide arm via the corresponding electrode, as for a one arm modulation procedure.

According to yet another aspect of the invention a duobinary modulator for delivering an optical signal according to a duobinary modulation format is provided. The duobinary modulator comprises: a) a non-linear Mach-Zehnder (MZ) optical modulator having first and second waveguide arms and corresponding first and second electrodes connected to the respective first and second waveguide arms; and b) an asymmetric drive circuit to provide a set of three asymmetric drive conditions. The set of three asymmetric drive conditions provides: i) biasing to both waveguide arms via the corresponding first and second electrodes at a first value of $V_{\pi/2}$ volts to obtain a duobinary 'off' output signal characteristic of a duobinary 'off' state; ii) biasing to the first waveguide arm via the first electrode at zero volts and biasing to the second waveguide arm via the second electrode at $V_\pi$ volts to obtain a first duobinary 'on' output signal characteristic of a first duobinary 'on' state; and, iii) biasing to the second waveguide arm via the second electrode at zero volts and biasing to the first waveguide arm via the first electrode at $V_\pi$ volts to obtain a second duobinary 'on' output signal characteristic of a second duobinary 'on' state. Again it is preferred that the first and second duobinary 'on' output signals and the duobinary 'off' output signal are substantially free from frequency chirp.

A third aspect of the invention provides a method of operating a non-linear Mach-Zehnder (MZ) optical modulator having first and second waveguide arms and corresponding first and second electrodes connected to the respective first and second waveguide arms, the method comprising: a) operating the non-linear Mach-Zehnder (MZ) optical modulator in a simple binary format by: i) biasing both waveguide arms via the corresponding first and second electrodes at a first value of $V_{\pi/2}$ volts to obtain an 'off' output signal; ii) biasing the first waveguide arm via the first electrode at zero volts and biasing the second waveguide arm via the second electrode at $V_\pi$ volts to obtain an 'on' output signal. In some embodiments, both the 'on' output signal and the 'off' output signal are substantially free from frequency chirp.

Another aspect of the invention provides a method of operating a non-linear Mach-Zehnder (MZ) optical modulator having first and second waveguide arms and corresponding first and second electrodes connected to the respective first and second waveguide arms, the method comprising: i) biasing both waveguide arms via the corresponding first and second electrodes at a first value to obtain an 'off' output signal; ii) biasing the first waveguide arm via the first electrode at a second value and biasing the second waveguide arm via the second electrode asymmetrically in relation to the first waveguide arm from the first value at a third value to obtain an 'on' output signal. In some embodiments, the asymmetric biasing provided substantially compensates for the non-linearity of the non-linear MZ optical modulator such that both the 'on' output signal and the 'off' output signal are substantially free from frequency chirp.

Other aspects and features of the present invention will become apparent to those of ordinary skill in the art upon review of the following description of specific embodiments of the invention in conjunction with the accompanying figures.

BRIEF DESCRIPTION OF THE DRAWINGS

The invention will now be described in greater detail with reference to the accompanying diagrams, in which.

DETAILED DESCRIPTION OF THE PREFERRED EMBODIMENTS

Non-linear MZ interferometers have not been used to provide the basis of a duobinary modulator because they suffer from intrinsic non-linear operating characteristics. In other words, these types of modulators based on a non-linear and complex refractive index change mechanism have considerably different operating characteristics as compared to the truly linear Mach-Zehnder optical modulators discussed above. The non-linear effects are induced by the Quantum Confined Stark Effect (QCSE) upon which the function of these MZ phase modulators is based. Specifically, the effect is that the phase shift in the modulator arms changes non-linearly in relation to a linear change in the drive (i.e. bias or modulation) voltage. In other words, a linear $LiNbO_3$ (lithium niobate) MZ optical modulator differs from a MQW III-V MZ optical modulator in that the latter shows a non-linear phase change as a function of the bias (drive) voltage.

It would be desirable to provide a method of operating an MQW III-V MZ optical modulator having a small footprint (size), low cost, and low power consumption that enables duobinary signalling to be practical for the long reach (e.g. 175 Km) 10 Gb/s metro space (i.e. metropolitan optical communication market). It is desirable that the method of operation results in providing a duobinary modulator that has balanced 'on' states; That is to say, both 'on' states should be characterized by having respective output signals with substantially equivalent: peak intensities; high extinction ratios; and low frequency chirp.

In order to provide a low power duobinary modulator for the long reach 10 Gb/s metro space that is relatively small and relatively inexpensive to make, a method of operating a Multiple Quantum Well (MQW) III-V Mach-Zehnder (MZ) optical modulator to have it provide a high-quality duobinary signal is provided. The method of operating the MQW III-V MZ optical modulator provided by the invention makes possible a high-quality duobinary modulator that has substantially balanced 'on' states. That is to say, both duobinary 'on' states are characterized by having respective output signals with substantially equivalent: peak intensities; high extinction ratios; and low frequency chirp.

Figure 1:
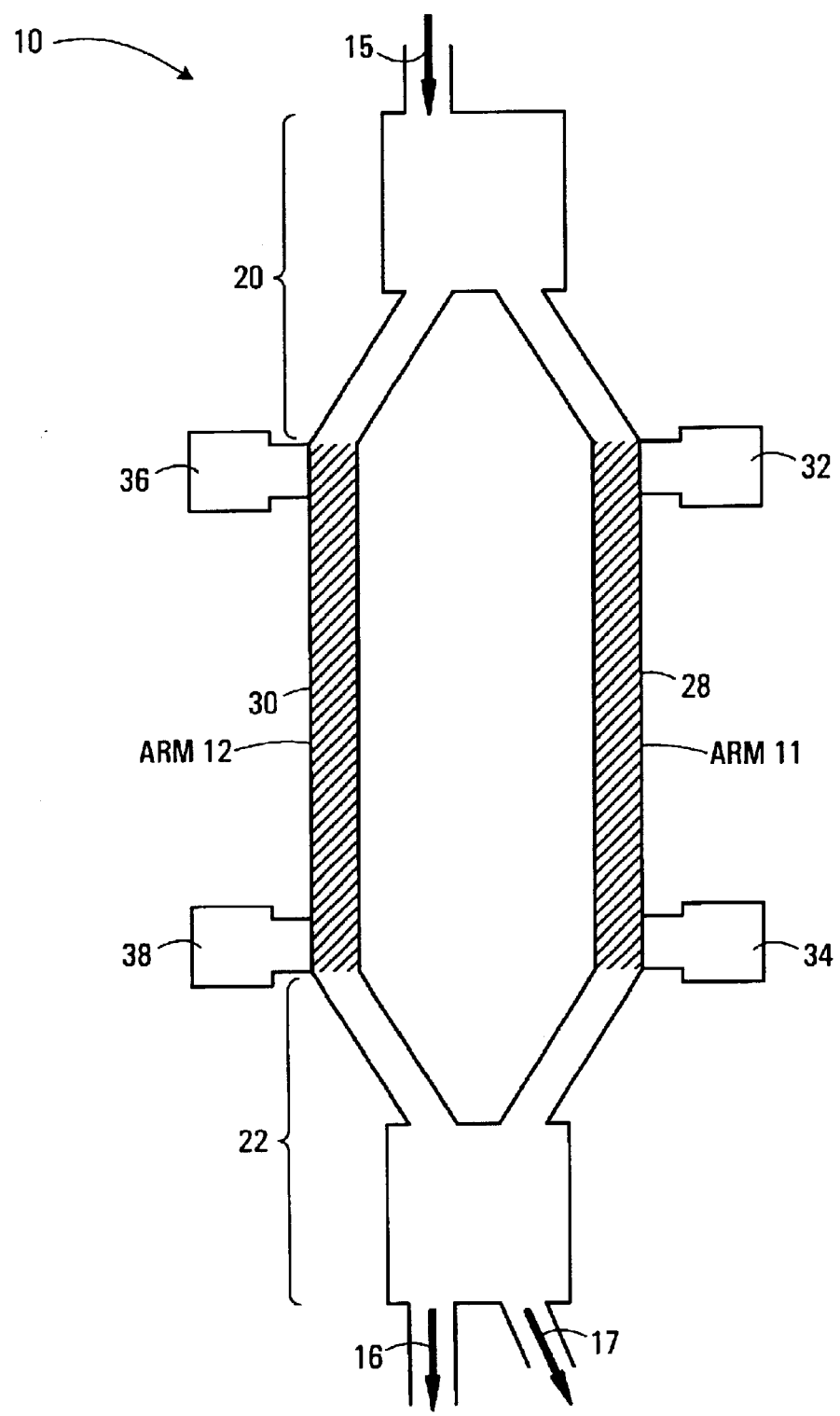
FIG. 1 is a diagram illustrating a Multiple Quantum Well (MQW) III-V MZ optical modulator.

Illustrated in FIG. 1 is a non-linear MQW III-V alloy MZ optical modulator 10, which is commonly known as a type of interferometer and from herein simply referred to as the modulator 10. The structure for the modulator 10 was initially described in Rolland et al. (U.S. Pat. No. 5,524,076); however, the modulator 10 will be operated according to the method provided by the present invention in order to make possible a high-quality duobinary modulator.

The modulator 10 comprises an optical waveguide splitter 20, an optical waveguide combiner 22 and waveguide arms 11 and 12 connected between the input waveguide splitter 20 and output waveguide combiner 22. Modulation electrodes 28 and 30 associated with waveguide arms 11 and 12 are located atop the surface of the respective waveguide arms 11 and 12. Pairs of drive pads 32,34 and 36,38 make electrical contact to the electrodes 28 and 30 respectively. Light is coupled into the modulator 10 by an optical waveguide 15, and the subsequently modulated light is coupled from the modulator 10 by an optical waveguide 16. Optical waveguide 17 is the dump port of optical waveguide combiner 22.

The waveguide splitter 20 and combiner 22 may be designed to provide either symmetric optical power splitting and recombining or asymmetric optical power splitting and recombining or a combination thereof in order to adjust the characteristics of the output optical signal delivered by the modulator 10. However, for simplicity it can be assumed that the input waveguide splitter 20 and output waveguide combiner 22 provide symmetric optical power splitting and recombining for the present embodiment of the invention.

It is preferable for the present embodiment to introduce, by a design choice, a built-in π radian phase shift between the optical beams traversing waveguide arms 11 and 12 respectively. The built-in π radian phase shift will cause the modulator 10 to be in the off-state in the absence of a differential drive voltage applied to the two modulation electrodes 28 and 30. In the preferred embodiment shown in FIG. 1 the built-in π radian phase shift is established by using a 1×2 multimode interference (MMI) coupler for the input splitter 20 and a 2×2 MMI coupler for the output combiner 22. Furthermore, in operation, it would be understood by those skilled in the art that an additional combination of hardware, software and firmware would be required to support the operation of modulator 10. Consequently, illustrated in FIG. 1 are only those features necessary to discuss aspects of the invention.

In operation, a light beam from a laser (not shown) operated in continuous wave (CW) mode is coupled via an optical coupler (also not shown) to the input waveguide 15 connected to the input waveguide splitter 20. The light-beam coupled into the modulator 10 via input waveguide 15 is first evenly split by the input waveguide splitter 20. The two resultant beams are guided into waveguide arms 11 and 12, they later recombine in the output waveguide combiner 22, and are then passed into either modulator output 16 the optical dump port 17. A differential voltage can be applied to the modulation electrodes 28 and 30 via the respective drive pad pairs 32,34 and 36,38 in order to induce a phase change between the beams travelling through the corresponding waveguide arms 11 and 12. This phase change will cause the waveguide combiner 22 to vary the optical beam power split between the optical dump port 17 and the modulator output (optical waveguide) 16. In this way the modulator 10 can be used to convert the CW laser output into a high bit rate modulated optical signal that can be coupled from the modulator output 16.

In accordance with one aspect of the invention, the modulator 10 is asymmetrically driven according to a dual arm modulation procedure. That is to say, a dual arm modulation voltage is provided in an asymmetric push-pull pattern in which the change in applied voltage experienced by each of the waveguide arms 11 and 12 is substantially unequal to the voltage swing experienced by the other. This results in the lowest electrical power drive requirements for duobinary modulation, and is opposite to the procedure which is disclosed in patent U.S. Pat. No. 5,524,076 (Col. 4, line 55–65) for simple binary modulation.

The above stated is true because for duobinary modulation special care must be taken to ensure that the two 'on' states remain substantially ±π radians out of phase while maximizing the extinction ratio between either one of the 'on' states and the single 'off' state. Concurrently, with this asymmetric electrical drive condition on the modulator arms 28 and 30 the non-linearity in the material refractive index change with applied electrical bias is compensated for to provide duobinary 'on' state transitions substantially free from frequency chirp. In addition the dual arm asymmetric electric drive condition ensures that the two 'on' states remain substantially ±π radians out of phase while maximizing the extinction ratio between either one of the 'on' states and the single 'off' state.

As a result, according to the invention the 'off' state becomes the default or nominal condition for the modulator 10 in which there is substantially complete destructive interference between each of the two respective light beams traversing corresponding waveguide arms 11 and 12 when they reunite in the combiner 22. And, in order to achieve this desired effect the electrodes 28 and 30 must both be biased with a drive voltage that corresponds to a +π/2 radian phase shift for single arm modulation as highlighted in FIG. 2. For example, this voltage will not simply be −(V$_π$)/2, given that V$_π$ is the voltage that induces the −π radian phase shift; rather it must be V$_{π/2}$. The V$_{π/2}$ voltage is typically found through a combination of measurement and theoretical knowledge of a given fabrication process.

Figure 2:
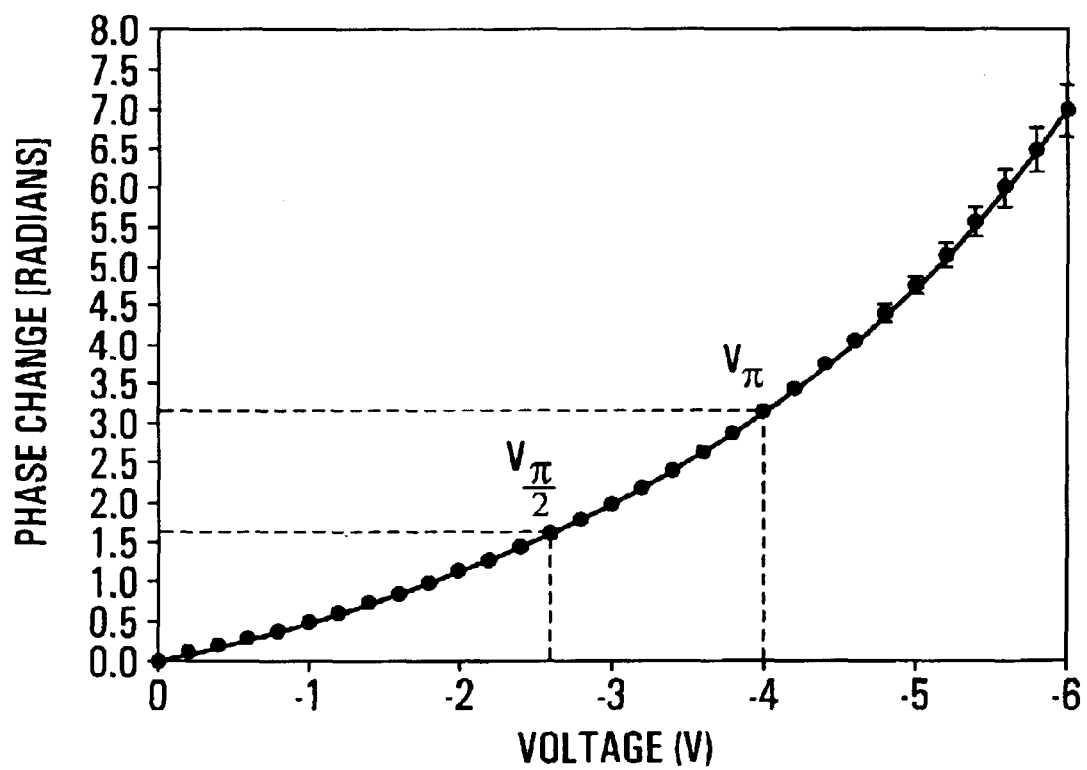
FIG. 2 is a plot showing the non-linear relationship between the phase change (in radians) and the drive voltage applied to a modulator like the one shown in FIG. 1.

Specifically, referring to FIG. 2, shown is a plot of the non-linear phase change (in radians) versus the modulation voltage for a typical MQW III-V material having InGaAsP quantum wells and barriers, used to form the modulator shown in FIG. 1. The plot clearly shows that there is a non-linear phase change in relation to a linear change in the modulation voltage. Thus, −2.57 volts (V) is the corresponding V$_{π/2}$ for a V$_π$ of −4.0 volts, not −2.0 volts as would be the case for a linear phase versus modulation voltage relationship.

Figure 3:
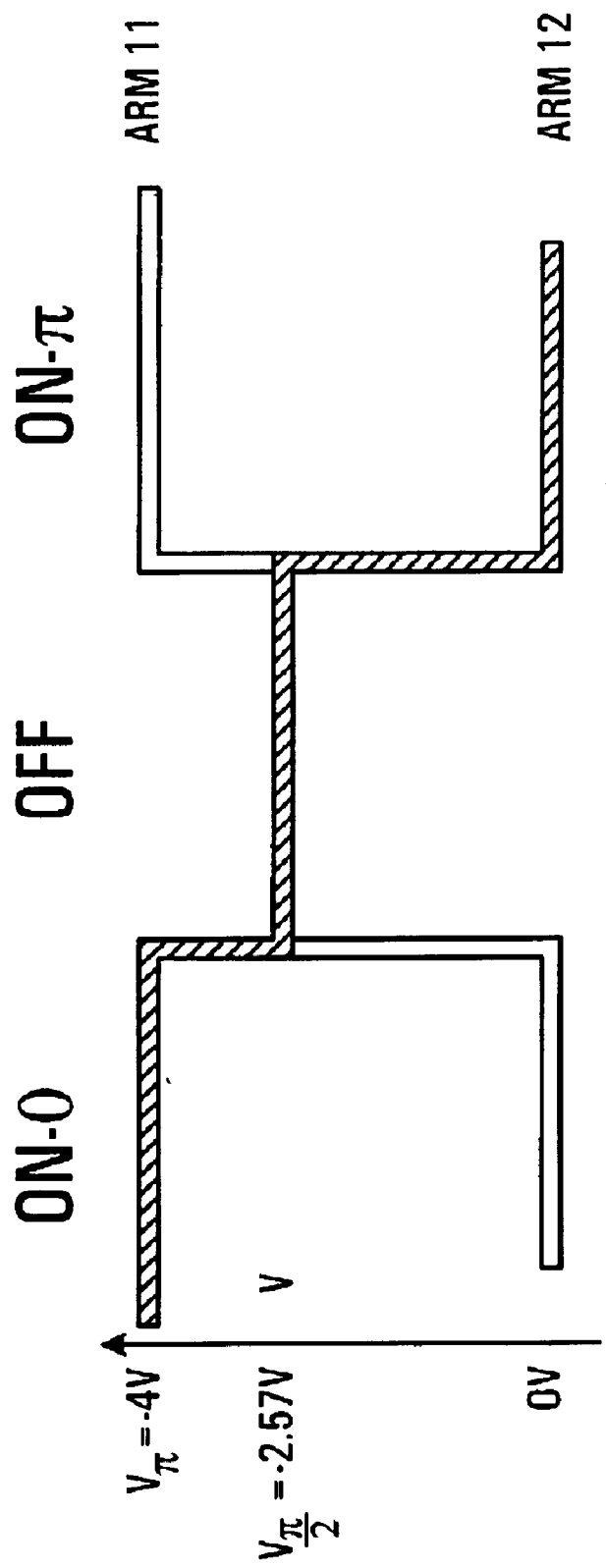
FIG. 3 illustrates the asymmetric dual arm push-pull drive conditions derived from the plot in FIG. 2 and for operating a modulator like the one shown in FIG. 1 according to one embodiment of the invention.

FIG. 3 illustrates asymmetric dual arm push-pull drive conditions, derived from the non-linear relationship shown in FIG. 2, for operating the modulator 10 (shown in FIG. 1) to provide a high-quality duobinary modulator according to one embodiment of the invention. Referring to the details of FIG. 3, in all three duobinary states the modulation voltage level applied to waveguide arm 11 is represented by a clear bar while the modulation voltage level applied to waveguide arm 12 is represented by a dashed bar.

In the duobinary 'off' state both waveguide arms 11 and 12 are biased at V$_{π/2}$. This drive condition results in nearly the total power in the two beams traversing waveguide arms 11 and 12 to be transferred into the optical dump port 17 by the combiner 22 and consequently almost no optical power leaves the modulator 10 via modulator output 16 (see FIG. 1). In fact, as long as the two arms are biased at the same DC voltage level the output optical power that is delivered to modulator output 16 will be substantially zero because the electrodes 28 and 30 will impart the same phase change to both waveguide arms 11 and 12. However, the V$_{π/2}$ level is specifically chosen to be the nominal duobinary 'off' condition because with this starting point the voltage swings of FIG. 3 will minimize the frequency chirp induced in the output optical signal for both duobinary 'on' states. Moreover, the electrical drive conditions of FIG. 3 provide substantially balanced: fast switching to the two opposite duobinary 'on' drive conditions; low overall power consumption; and high extinction ratios between the duobinary 'on' states and duobinary 'off' state.

The first duobinary 'on' state, which is defined as having the modulator 10 provide maximum optical output power with a zero phase shift, is provided by applying 0V to electrode 28 and V$_π$ to electrode 30. The second duobinary 'on' state, which is defined as having the modulator 10 provide maximum optical output power with a π phase shift, is provided by applying 0V to electrode 30 and V$_π$ to electrode 28.

Figure 4A:
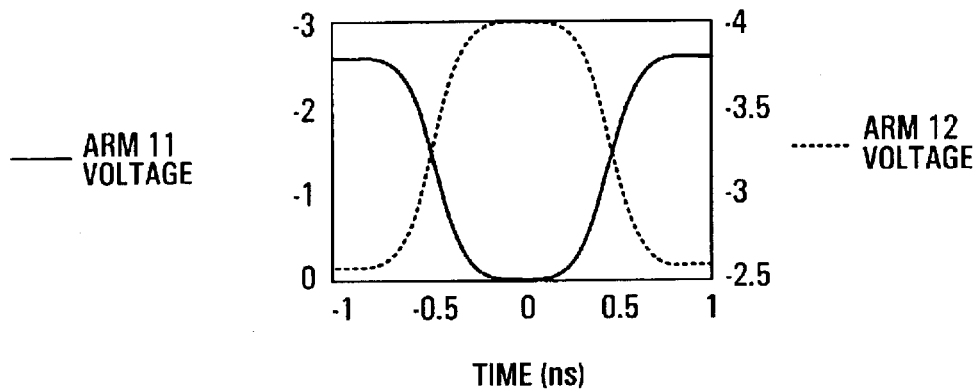
FIG. 4A shows the simulated switching of the drive (modulation) voltages applied to a modulator like the one shown in FIG. 1 to arrive at a first 'on' state from an 'off' state.
Figure 4B:
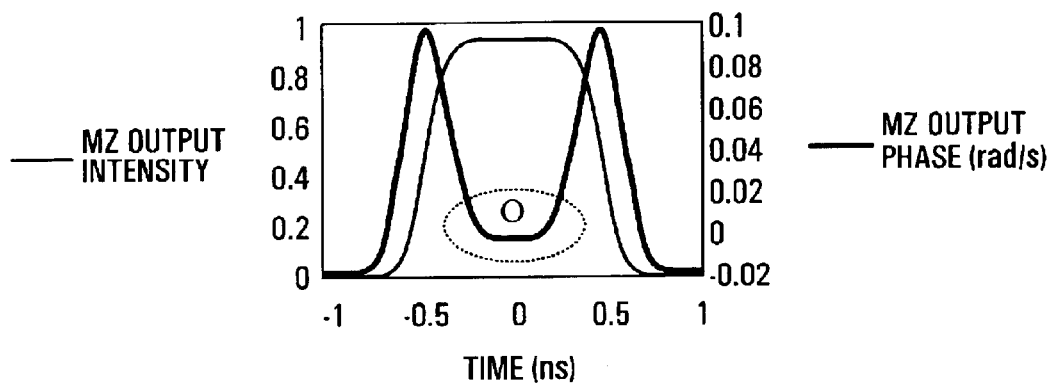
FIG. 4B shows a plot of the output intensity and phase for the first 'on' state resulting from the corresponding drive conditions shown in FIG. 4A.
Figure 4C:
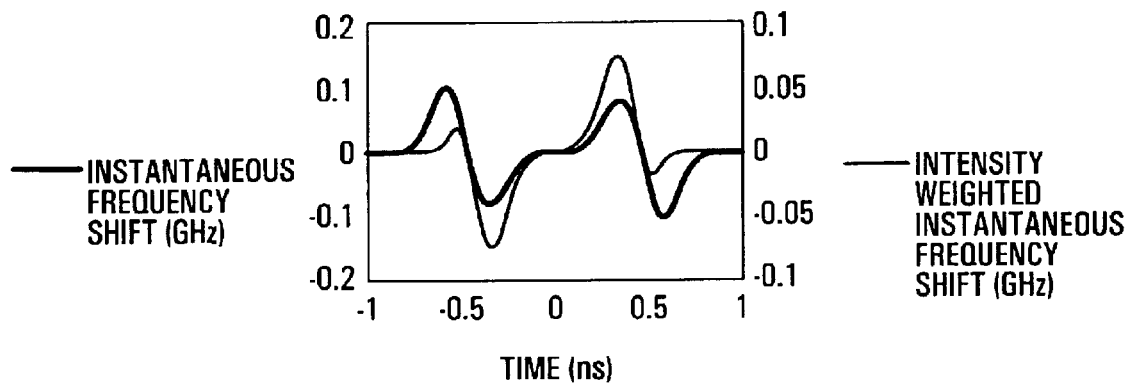
FIG. 4C shows a plot of the output instantaneous frequency shift and intensity weighted instantaneous frequency shift for the first 'on' state resulting from the corresponding drive conditions shown in FIG. 4A.

FIGS. 4A–4C show the simulation results for asymmetric dual arm push-pull drive conditions that switch the modulator 10 from the duobinary 'off' state to the first duobinary 'on' state. In FIG. 4A, the drive (modulation) voltage applied to electrode 28 is forced to 0v from V$_{π/2}$ and the voltage applied to electrode 30 is forced to V$_π$ from V$_{π/2}$, which results in the first desired output state (ON-0). This is shown in FIG. 4B where the modulator 10 output is at a maximum intensity and the phase is substantially zero radians. FIG. 4C shows the simulated change in frequency chirp as the modulator 10 is switched into and out of the first duobinary 'on' state. Beneficially, the maximum instantaneous frequency shift (otherwise characterized as the maximum instantaneous frequency chirp) is barely ±0.10 GHz during the transitions, and the maximum intensity weighted frequency shift (otherwise characterized as the maximum intensity weighted frequency chirp) is only ±0.073 GHz through the same switching vector. Both measurements are extremely positive indicators of an overall minimization of frequency chirp accomplished by the present invention in which a asymmetric electrical drive conditions are used to compensate for the non-linear material phase shift as a function of electrical bias.

Figure 5A:
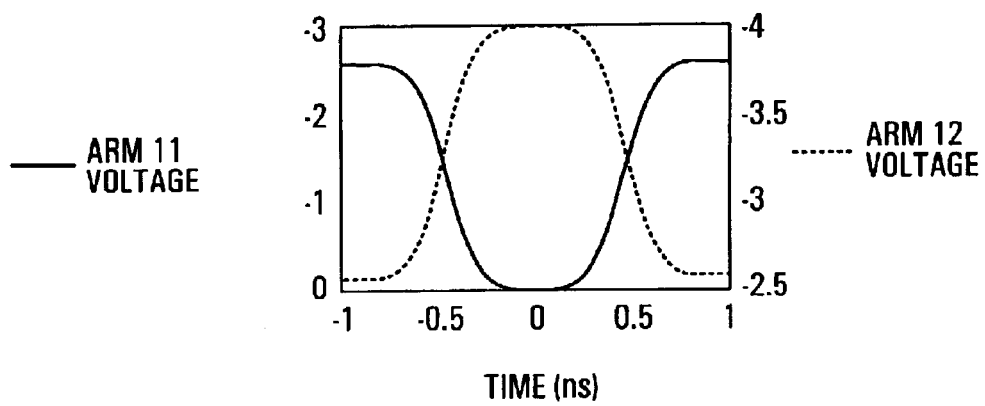
FIG. 5A shows the simulated switching of the drive (modulation) voltages applied to a modulator like the one shown in FIG. 1 to arrive at a second 'on' state from the 'off' state.
Figure 5B:
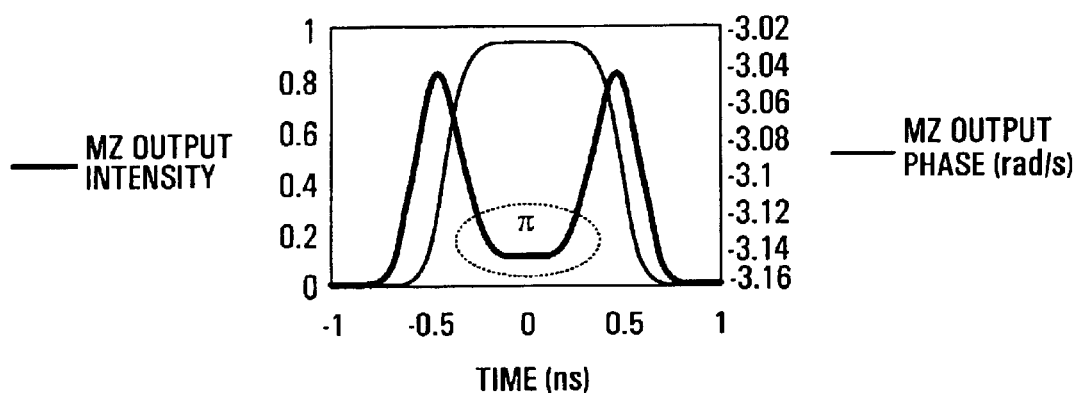
FIG. 5B shows a plot of the output intensity and phase for the second 'on' state resulting from the corresponding drive conditions shown in FIG. 5A.
Figure 5C:
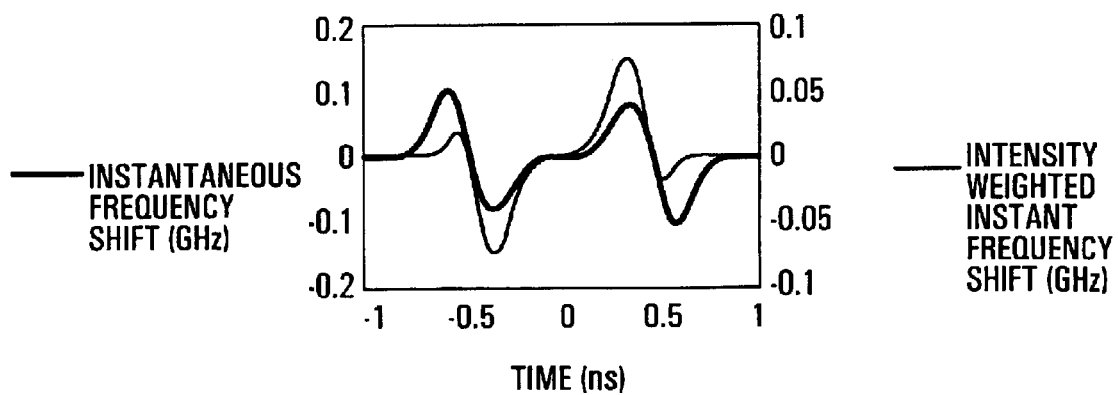
FIG. 5C shows a plot of the output instantaneous frequency shift and intensity weight instantaneous frequency shift for the second 'on' state resulting from the corresponding drive conditions shown in FIG. 5A.

The positive effects are equally as good for the opposite switching vector that demonstrates the switching of the modulator 10 from the duobinary 'off' state to the second duobinary 'on' state. These results are shown in an identical set of simulations given in FIGS. 5A–5C. The switching of the modulator 10 into the second duobinary 'on' state results in modulator 10 providing an optical output signal that has equal intensity to that of the first duobinary 'on' state but with a π radian phase shift, as seen in FIG. 5B. And, as seen in FIG. 5C, the maximum instantaneous frequency chirp and maximum intensity weighted instantaneous frequency chirp are ±0.10 GHz and ±0.073 GHz respectively for this switching vector. Clearly these results are substantially identical to those for the switching vector used in the simulation of the first duobinary 'on' state.

The simulation results given in the FIGS. 4A–4C and 5A–5C are summarized in Table 1.0 shown below, along with simulation results for symmetric dual arm push-pull electrical drive conditions. The symmetric electrical drive conditions are characterized by the duobinary 'off' state having (V$_π$)/2 voltage applied to each of electrodes 28 and 30 instead of the V$_{(π/2)}$ in the case of the asymmetric drive conditions. From Table 1.0 it is clear that both the symmetric and asymmetric drive conditions result in equally low power consumption, which is indicated by the maximum voltage applied to any one electrode 28 or 30, and corresponding equally low and equally high insertion losses and extinction ratios respectively. However, the symmetric drive conditions provide a duobinary modulator that suffers from unacceptably high frequency chirp as is indicated by the 3 dB chirp parameter (α), maximum instantaneous frequency chirp (i.e. maximum frequency shift) and maximum intensity weighted frequency chirp (i.e. intensity weighted frequency shift). The asymmetric electrical drive conditions substantially compensate for the non-linearity in the material refractive index change with applied electrical bias to provide duobinary 'on' state transitions substantially free from frequency chirp.

TABLE 1.0

Asymmetric & Symmetric Duobinary Drive Conditions

| | Asymmetric Drive OFF-to-ON-0 | Asymmetric Drive OFF to ON-π | Symmetric Drive OFF-to-On-0 | Symmetric Drive Off to ON-π |
|---|---|---|---|---|
| On State Insertion Loss [dB] | −0.24 | −0.24 | −0.24 | −0.24 |
| Extinction Ratio DC [dB] | 30 dB | 30 dB | 30 dB | 30 dB |

TABLE 1.0-continued

Asymmetric & Symmetric Duobinary Drive Conditions

|  | Asymmetric Drive OFF-to-ON-0 | Asymmetric Drive OFF to ON-$\pi$ | Symmetric Drive OFF-to-On-0 | Symmetric Drive Off to ON-$\pi$ |
|---|---|---|---|---|
| 3dB Chirp Parameter [$\alpha$] | 0.0028 | 0.0028 | −0.294 | −0.294 |
| Max Frequency Chirp [GHz] | 0.101 | 0.101 | 0.254 | 0.254 |
| Max Intensity Weighted Frequency Chirp [GHz] | 0.073 | 0.073 | 0.208 | 0.208 |
| Electrode 28 Voltage Swing [V] | −2.57 V to 0 V | −2.57 V to −4 V | −2 V to 0 V | −2 V to 0 V |
| Electrode 30 Voltage Swing [V] | −2.57 to −4 V | −2.57 V to 0 V | −2 V to −4 V | −2 V to −4 V |

While the preferred embodiment of the present invention has been described and illustrated, it will be apparent to those persons skilled in the art that numerous modifications and variations are possible. Specifically, it should be obvious to persons skilled in the art that the invention could be adapted to tailor the frequency chirp of MZ interferometers having other optical configurations, and/or having other mechanisms for inducing non-linear characteristics into the output optical signal, for instance as a result of the MZ operation and physical reaction to driving voltages or environmental factors such as temperature or interfering radiation.

I claim:

1. A method of operating a non-linear Mach-Zehnder (MZ) optical modulator having first and second waveguide arms and corresponding first and second electrodes connected to the respective first and second waveguide arms, the method comprising:
   a) operating the non-linear MZ optical modulator in a duobinary modulation format by:
   i) biasing both waveguide arms via the corresponding first and second electrodes at a first value of $V_{\pi/2}$ volts to obtain a duobinary 'off' output signal characteristic of a duobinary 'off' state;
   ii) biasing the first waveguide arm via the first electrode at zero volts and biasing the second waveguide arm via the second electrode at $V_\pi$ volts to obtain a first duobinary 'on' output signal characteristic of a first duobinary 'on' state; and
   iii) biasing the second waveguide arm via the second electrode at zero volts and biasing the first waveguide arm via the first electrode at $V_\pi$ volts to obtain a second duobinary 'on' output signal characteristic of a second duobinary 'on' state.

2. The method according to claim 1, wherein the duobinary modulation defines:
   i) the first duobinary 'on' state as having the first duobinary 'on' output signal characterized as when the optical output power of the non-linear MZ optical modulator is at its peak intensity with a zero radian phase shift;
   ii) the second duobinary 'on' state as having the second duobinary 'on' output signal characterized as when the optical output power of the non-linear MZ optical modulator is at its peak intensity with a ±$\pi$ radian phase shift; and
   iii) the duobinary 'off' state as having the duobinary 'off' output signal characterized as when the optical output power of the non-linear MZ optical modulator is substantially non-existent.

3. The method according to claim 1, wherein the first and second duobinary 'on' output signals and the duobinary 'off' output signal are substantially free from frequency chirp.

4. The method according to claim 1, wherein the non-linear MZ optical modulator is a Multiple Quantum Well (MWQ) III-V MZ optical modulator.

5. The method according to claim 4, wherein the non-linear MWQ III-V MZ optical modulator is adapted to include a ±$\pi$ radian phase shift between waveguide arms comprising the MWQ III-V MZ optical modulator.

6. The method according to claim 4 wherein the III-V material comprising the Multiple Quantum Well (MQW) III-V MZ optical modulator is Indium Phosphide (InP) and the multiple quantum wells are composed of a Indium Gallium Arsenide Phosphide (InGaAsP) alloy.

7. The method according to claim 1, wherein the non-linear MZ optical modulator is comprised of III-V bulk materials.

8. The method according to claim 1, wherein the non-linear MZ optical modulator is comprised of polymer materials.

9. The method according to claim 1, wherein the value $V_{\pi/2}$ is the minimum voltage at which the phase of the non-linear MZ optical modulator output is ±$\pi$/2 radians when a drive voltage is applied to one waveguide arm via the corresponding electrode, as for a one arm modulation procedure.

10. The method according to claim 1, wherein the value $V_\pi$ is the minimum voltage at which the phase of the non-linear MZ optical modulator output is ±$\pi$ radians when a drive voltage is applied to one waveguide arm via the corresponding electrode, as for a one arm modulation procedure.

11. A duobinary modulator for delivering an optical signal according to a duobinary modulation format, the duobinary modulator comprising:
   a) a non-linear Mach-Zehnder (MZ) optical modulator having first and second waveguide arms and corresponding first and second electrodes connected to the respective first and second waveguide arms;
   b) an asymmetric drive circuit to provide a set of three asymmetric drive conditions;
   wherein the set of three asymmetric drive conditions provides:
   i) biasing to both waveguide arms via the corresponding first and second electrodes at a first value of $V_{\pi/2}$ volts to obtain a duobinary 'off' output signal characteristic of a duobinary 'off' state;

ii) biasing to the first waveguide arm via the first electrode at zero volts and biasing to the second waveguide arm via the second electrode at $V_\pi$ volts to obtain a first duobinary 'on' output signal characteristic of a first duobinary 'on' state; and iii) biasing to the second waveguide arm via the second electrode at zero volts and biasing to the first waveguide arm via the first electrode at $V_\pi$ volts to obtain a second duobinary 'on' output signal characteristic of a second duobinary 'on' state.

12. The duobinary modulator of claim 11, wherein the first and second duobinary 'on' output signals and the duobinary 'off' output signal are substantially free from frequency chirp.

* * * * *